United States Patent [19]

Thum

[11] Patent Number: 5,279,876
[45] Date of Patent: Jan. 18, 1994

[54] LIMITED COMPRESSIBILITY SUPPORT STRUCTURE

[75] Inventor: Holger M. Thum, Brunswick, Fed. Rep. of Germany

[73] Assignee: Volkswagen AG, Wolfsburg, Fed. Rep. of Germany

[21] Appl. No.: 755,297

[22] Filed: Sep. 5, 1991

[30] Foreign Application Priority Data

Sep. 29, 1990 [DE] Fed. Rep. of Germany ....... 4030932

[51] Int. Cl.$^5$ ................................................ B32B 7/08
[52] U.S. Cl. ...................................... 428/52; 428/542.2
[58] Field of Search ................. 297/180; 428/52, 12, 428/53, 542.2; 152/213A

[56] References Cited

U.S. PATENT DOCUMENTS

| | | | |
|---|---|---|---|
| 2,404,846 | 7/1946 | Kalisher | 428/52 |
| 3,377,103 | 4/1968 | Borton et al. | 297/180 X |
| 3,764,446 | 10/1973 | Martin | 428/52 |
| 4,268,557 | 5/1981 | Bracesco | 428/71 |
| 4,493,865 | 1/1985 | Kuhlmann et al. | 428/54 X |
| 4,685,727 | 8/1987 | Cremer et al. | 297/180 |
| 4,806,405 | 2/1989 | Liebl | 428/54 X |
| 4,865,379 | 9/1989 | Aoki et al. | 297/180 |

FOREIGN PATENT DOCUMENTS

3609095  9/1988  Fed. Rep. of Germany .

Primary Examiner—Henry F. Epstein
Attorney, Agent, or Firm—Brumbaugh, Graves, Donohue & Raymond

[57] ABSTRACT

A mat-like structure contains a substantially planar support array, which may be in the form of a lattice or an array of separate members, and a plurality of elastically yielding integral elements consisting of at least two half-arches having their free ends connected to different points of the support array. The structure may be used, for example, for a vehicle seat, a snow chain or a load restraint device.

12 Claims, 7 Drawing Sheets

LIMITED COMPRESSIBILITY SUPPORT STRUCTURE

BACKGROUND OF THE INVENTION

This invention relates to limited-compressibility support structures having elastically deformable elements.

German Patent No. 36 09 095 discloses a support structure of limited compressibility for use in a vehicle seat pad. That structure provides a spacer which assures that, even when a load is placed on the seat pad by a seated person, a space traversed by airflow is maintained in the pad. That structure comprises elements of an essentially plane truss referred to as compression distributors and not directly connected to each other. Each compression distributor includes compression members set perpendicular to the plane of the truss and abutting at their free ends by slightly convex elastically deformable parts, referred to as spacers, at their free ends. In top view, these convex deformable parts are more or less star-shaped, so that each indirectly connects several compression distributors. Near the vertices of their convexities, these parts connect in turn with similarly shaped elastically deformable elements constituting a second layer.

SUMMARY OF THE INVENTION

Accordingly, it is an object of the present invention to provide a limited-compressibility support structure which overcomes the disadvantages of the prior art.

Another object of the invention is to provide a limited-compressibility support structure having a simple construction, which assures coherence of all parts of a truss composed of disconnected elements in a simple manner, and is usable in many applications without modification of the principle. A tire chain apparatus and a load restraint in a vehicle are representative examples.

These and other objects of the invention are attained by providing a support structure including a plurality of elastically deformable integral elements containing two half-arches having their free ends affixed to spaced points in the support structure.

A special advantage of the invention is that it solves the problem of providing limited-compressibility support by providing very simple arcuate spring member components which have been proved in principle. Whereas in the prior art discussed above, each elastically deformable element requires a plurality of individual structural sections, according to the invention each deformable element consists simply of at least two half-arches of elastically deformable material which are joined to provide a one-piece transition from one arch to the other near their vertex.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

In considering the structures shown in FIGS. 1 to 3 and 7 to 12, it should be noted that, in order to clarify the different elements of the structure, the elastically deformable elements composed of half-arches are shown schematically in dotted lines while the lattice shapes of the supporting structures are represented by solid lines.

Figure 1:
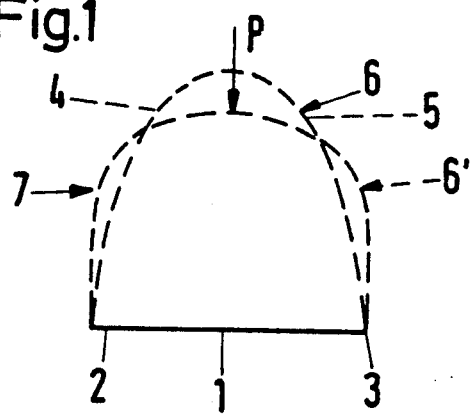
FIG. 1 is a schematic side view illustrating the operation of an elastically deformable element consisting of two half-arches, together with a corresponding portion of the basic support structure in accordance with the invention.

Referring first to FIG. 1, a supporting structure 1, which may be in the form of a lattice, has two spaced points 2 and 3. An elastically deformable element 6, consisting of two half-arches 4 and 5 joined at their vertex, has its free ends supported at two points 2 and 3. In the illustrated example, the element 6 has approximately the shape of half a sine wave when in the unloaded condition. If a compressive force P is applied at the vertex, the deformable element 6 will be compressed to assume the shape shown by the line 6'. If the overall structure 7 containing the deformable element 6 shown in FIG. 1 is a pad for a motor vehicle seat, for example, the compressive force P results from the weight of a passenger on the seat. Since the elastically deformable elements are partially compressed by the force P, but do not make contact with the support structure 1, an intervening space is maintained by the elastically deformable elements serving, for example, to permit circulation of air and, consequently, removal of moisture.

Figure 2:
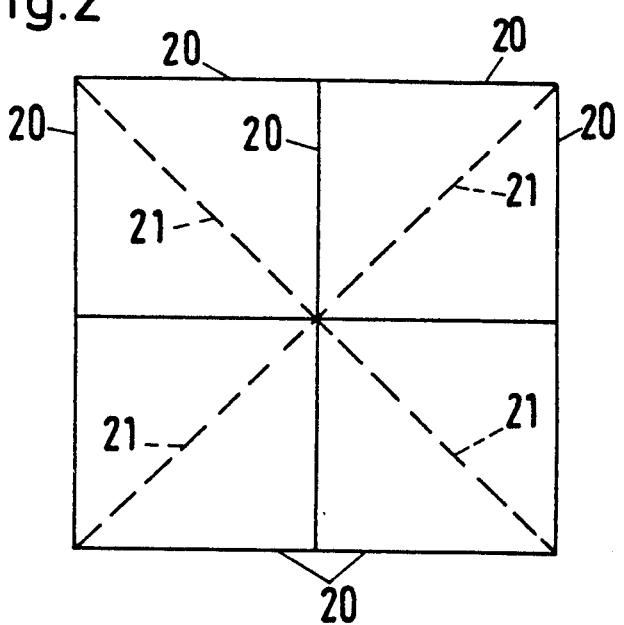
FIGS. 2 and 3 are schematic top views illustrating the arrangement of other basic structures with elastically deformable elements consisting of two half-arches.

FIG. 2 shows a portion of a support structure 20 based on the principle described with reference to FIG. 1. In this case, the support structure 20 is in the form of a lattice seen in plan view. Several elastically deformable elements 21, each consisting of two half-arches according to FIG. 1, are supported above the support structure with their free ends affixed to different points of the support structure 20.

Figure 3:
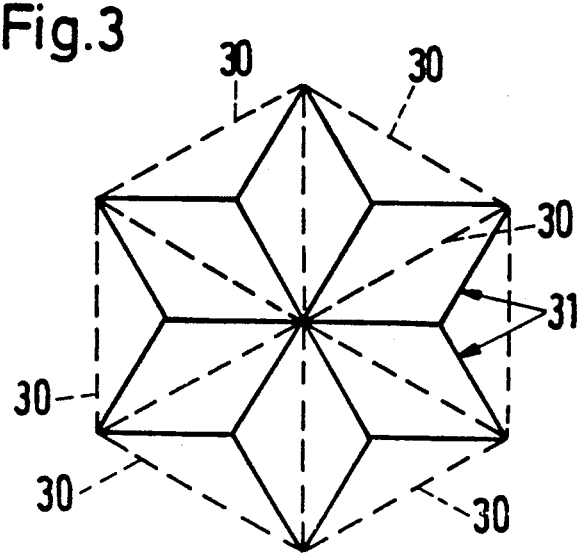

In FIG. 3, an array of elastically deformable elements 30, each consisting of two half-arches, are mounted on a lattice-like support structure 31. Thus, it is evident that the principle of the invention as described with reference to FIG. 1 is applicable to a multitude of different structural arrangements.

Figure 4:
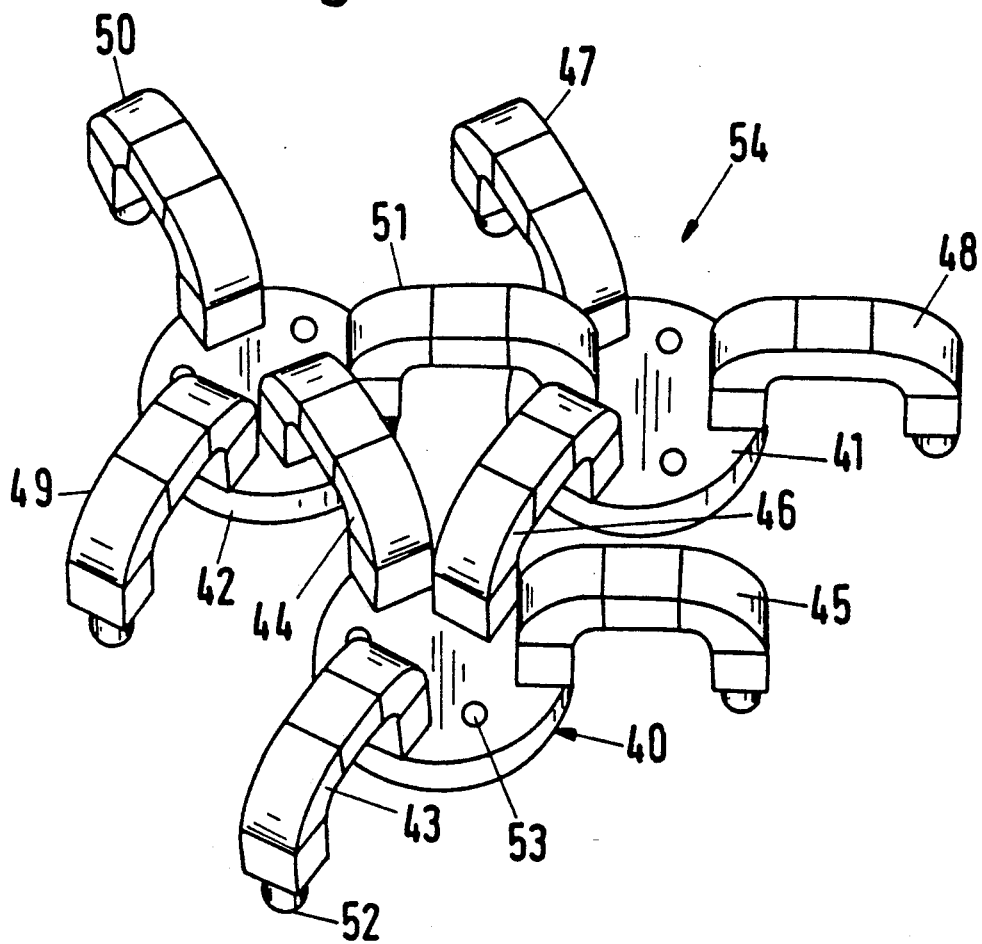
FIG. 4 is a schematic perspective view showing a representative support structure of limited compressibility in accordance with the invention utilizing elastically deformable elements consisting of two half-arches and a truss structure and having subdivisions formed by unconnected members.
Figure 5:
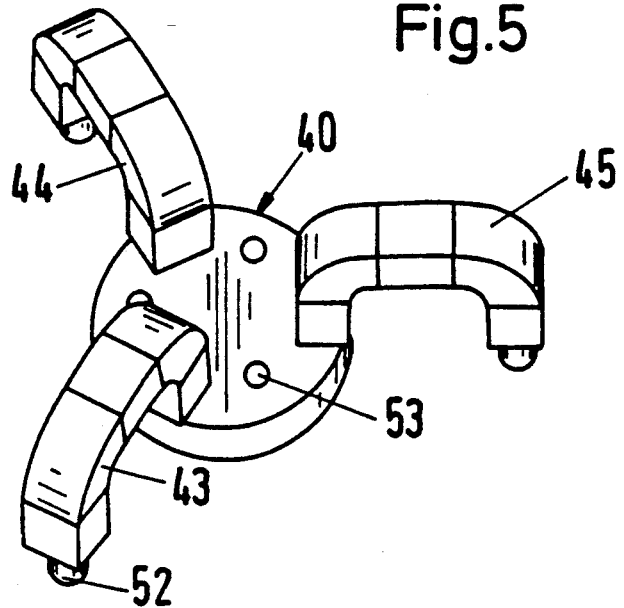
FIG. 5 illustrates one of the structural elements included in the structure of FIG. 4.

FIGS. 4 and 5, unlike the embodiments thus far described, relate to a structure having a support structure composed of disconnected support units. In FIG. 4, three such units 40, 41 and 42 are illustrated. In this case, an array of separate elastically deformable elements 43-51, each consisting of two half-arches, have their free ends supported by the separate support units. Each of the deformable elements 43-51 has pins 52 at the free ends for engaging corresponding recesses 53 in the support units to which it is joined. As FIG. 4 shows, all of the separate support units 40-42 are connected indirectly through the one-piece elastically deformable elements which are arranged side by side in a layer. By virtue of the plug connections formed by the pins 52 and recesses 53, the shape and size of the overall structure 54 may be varied at will and may be adapted to a particular use. Thus, as indicated in FIG. 5, the overall structure may, if desired, be composed of separate individual structural units consisting in this example of one support structure unit 40 and three deformable elements 43-45.

Figure 6:
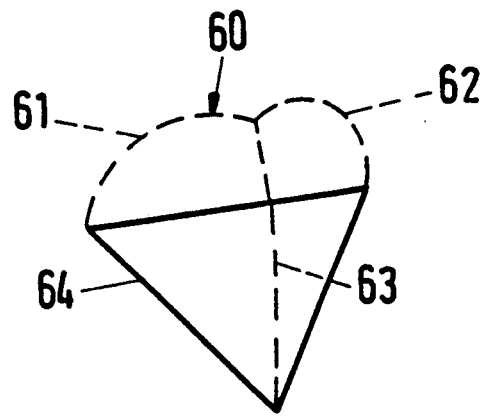
FIG. 6 is a schematic perspective view showing another type of elastically deformable element consisting of three half-arches arranged in a basic triangular lattice structure.

FIG. 6 shows a perspective view of an elastically deformable element 60 composed of three half-arches 61, 62 and 63 joined at their vertices to provide an integral element. The free ends of the half-arches 61, 62 and 63 may be connected to three different points of a lattice-like support structure 64 by welding or bonding or by pinning as described with reference to FIGS. 4 and 5.

Figure 7:
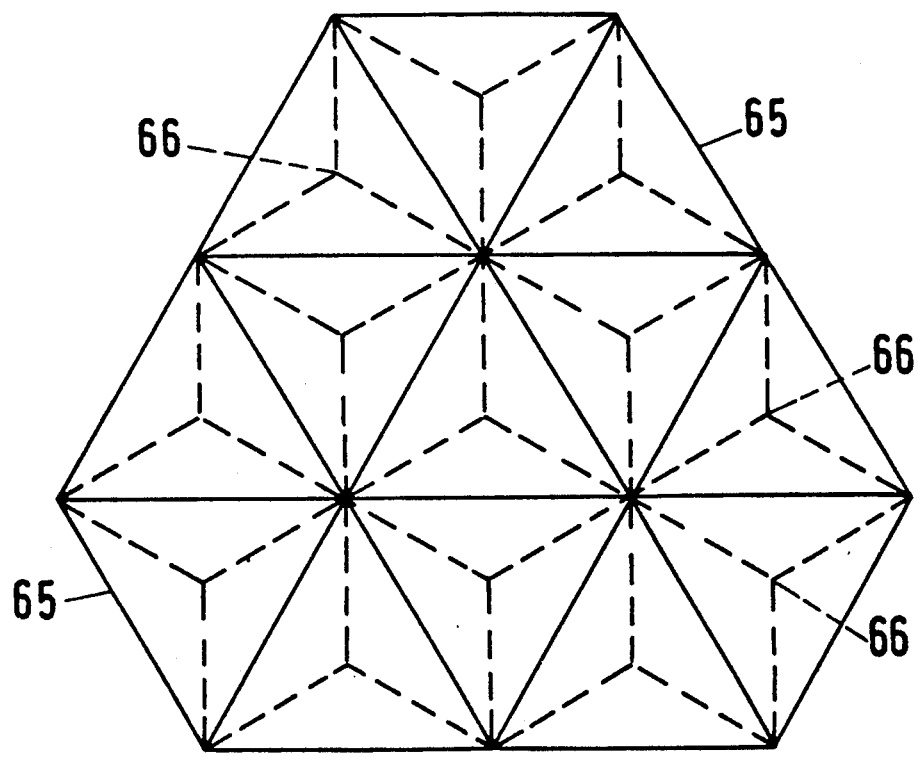
FIG. 7 is a schematic plan view illustrating a representative support structure of limited compressibility composed of deformable elements of the type shown in FIG. 6.

FIG. 7 shows another embodiment of the invention, based on the principle described with reference to FIG. 6. The support structure 65 shown in solid lines supports an array of elastically deformable elements 66, each consisting of three half-arches as described with reference to FIG. 6.

Figure 8:
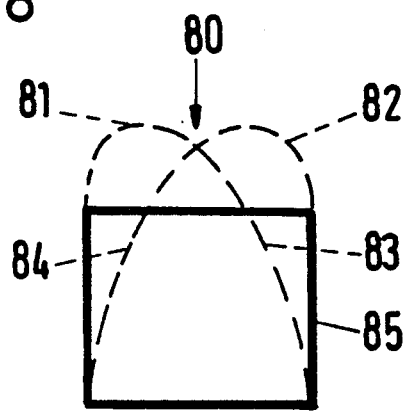
FIG. 8 is a schematic perspective view showing a further type of elastically deformable element consisting of four half-arches arranged in a basic structure in the form of a square lattice.
Figure 9:
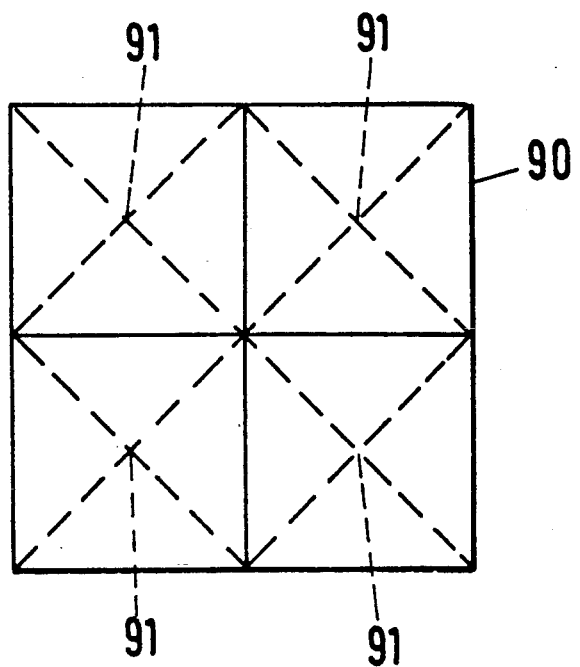
FIG. 9 is a schematic plan view illustrating a support structure composed of elastically deformable elements of the type shown in FIG. 8.

The arrangements shown in FIGS. 8 and 9 are based on a support structure having a square lattice shape. In FIG. 8, an elastically deformable element 80 consists of four half-arches 81-84 joined at their vertices and spaced by equal angles about the common vertex. The four free ends of the half-arches are supported at the corners of a square support member 85.

In FIG. 9, a support structure 90 consists of an array of square support members supporting a series of elastically deformable elements 91, each arranged as described with reference to FIG. 8.

Figure 10:
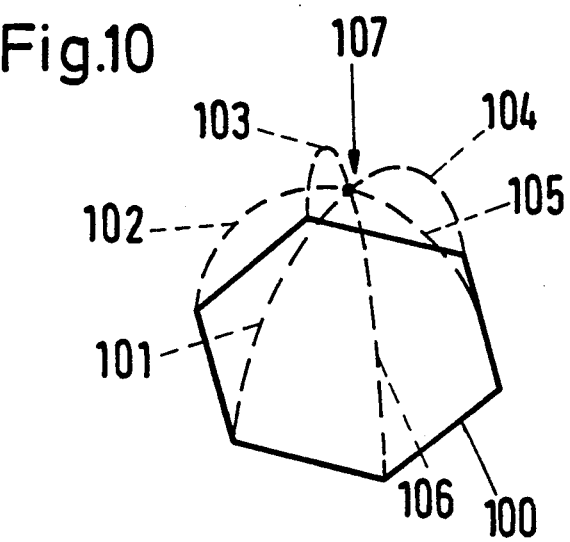
FIG. 10 is a schematic perspective view showing an elastically deformable element consisting of six half-arches arranged in a basic structure with a hexagonal lattice shape.
Figure 11:
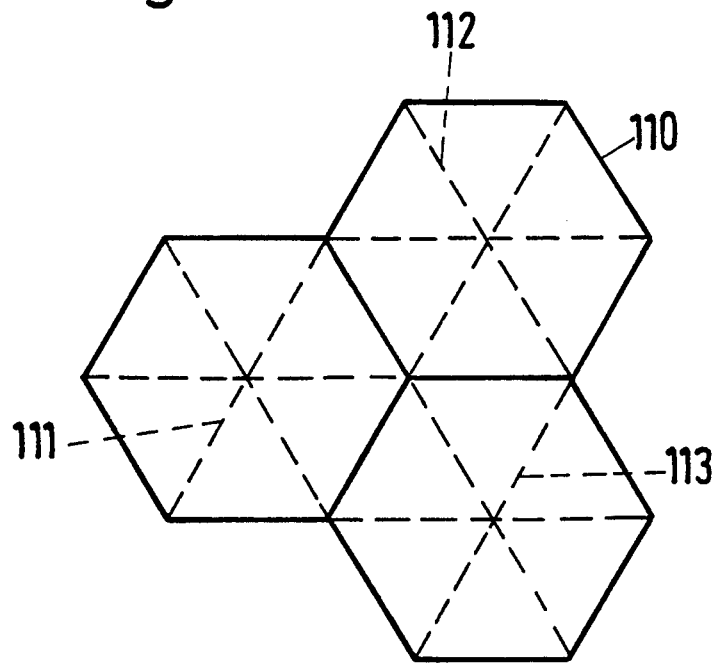
FIG. 11 is a schematic plan view of a support structure containing three elements of the type shown in FIG. 10.

The arrangements shown in FIGS. 10 and 11 further demonstrate that the principle of the invention using elastically deformable elements can be applied to a large number of possible embodiments which may provide, for example, differential rigidities in the direction of the applied pressure. Thus, FIG. 10 shows a support structure 100 of hexagonal section. The free ends of six half-arches 101-106, which are joined at their vertex, are supported at the six corners of the support structure 100 so as to provide an elastically deformable element 107.

FIG. 11 is a plan view of three adjacent units arranged according to FIG. 10. In this arrangement, a support structure 110 supports the three contiguous elastically deformable elements 111, 112 and 113.

Figure 12:
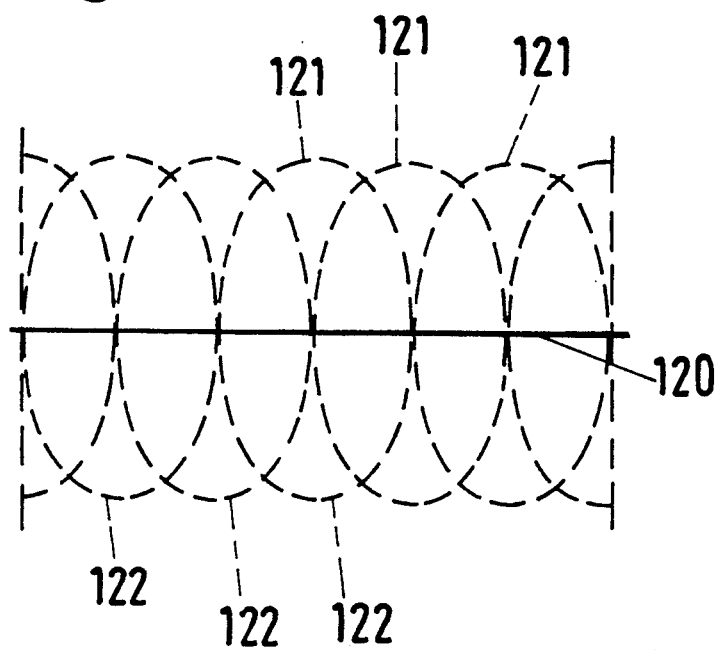
FIG. 12 is a schematic side view showing a support structure with elastically deformable elements projecting in opposed directions.

In the typical embodiments described thus far, the support structure has elastically deformable elements on only one side. FIG. 12 illustrates an arrangement according to the invention having elastically deformable elements 121 and 122, respectively, on both sides of a base structure 120. This provides, for example, a mat having a bilaterally elastic structure with the advantages of greater height and greater resilience.

Figure 13:
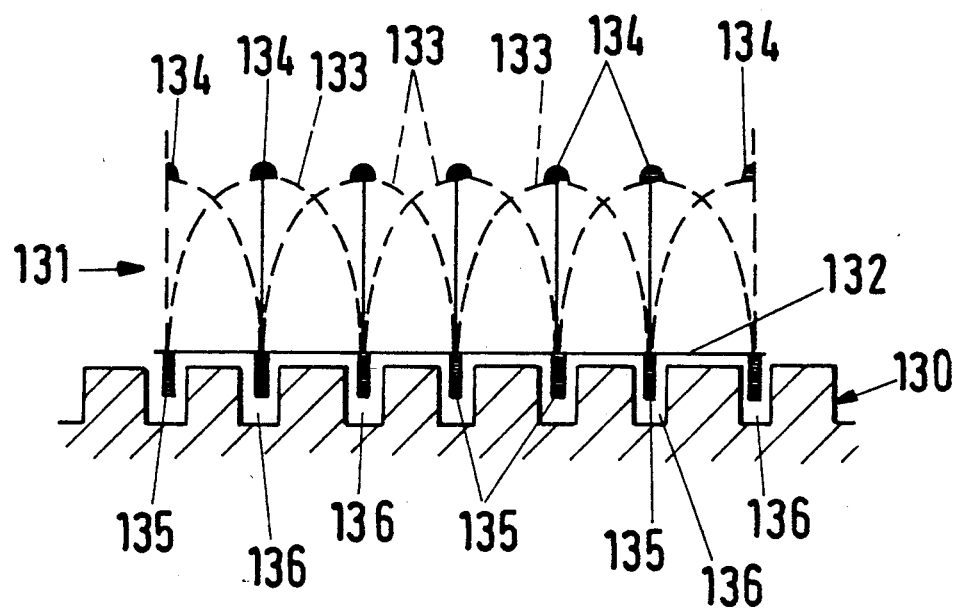
FIG. 13 is a schematic side view showing a configuration of elastically deformable elements arranged in a structure for use as a snow chain.

FIG. 13 shows an embodiment of the structure according to the invention for use as a snow chain 131 to be placed on a tire 130. Here, a base structure 132 supports a series of elastically deformable elements 133 of the described construction fitted with spikes 134 at their vertices on its outer side. On the other side of the base structure 132, catch pins 135 are provided to engage grooves 136 in the tire 130 and prevent relative motion between the tire and the snow chain 131.

Figure 14:
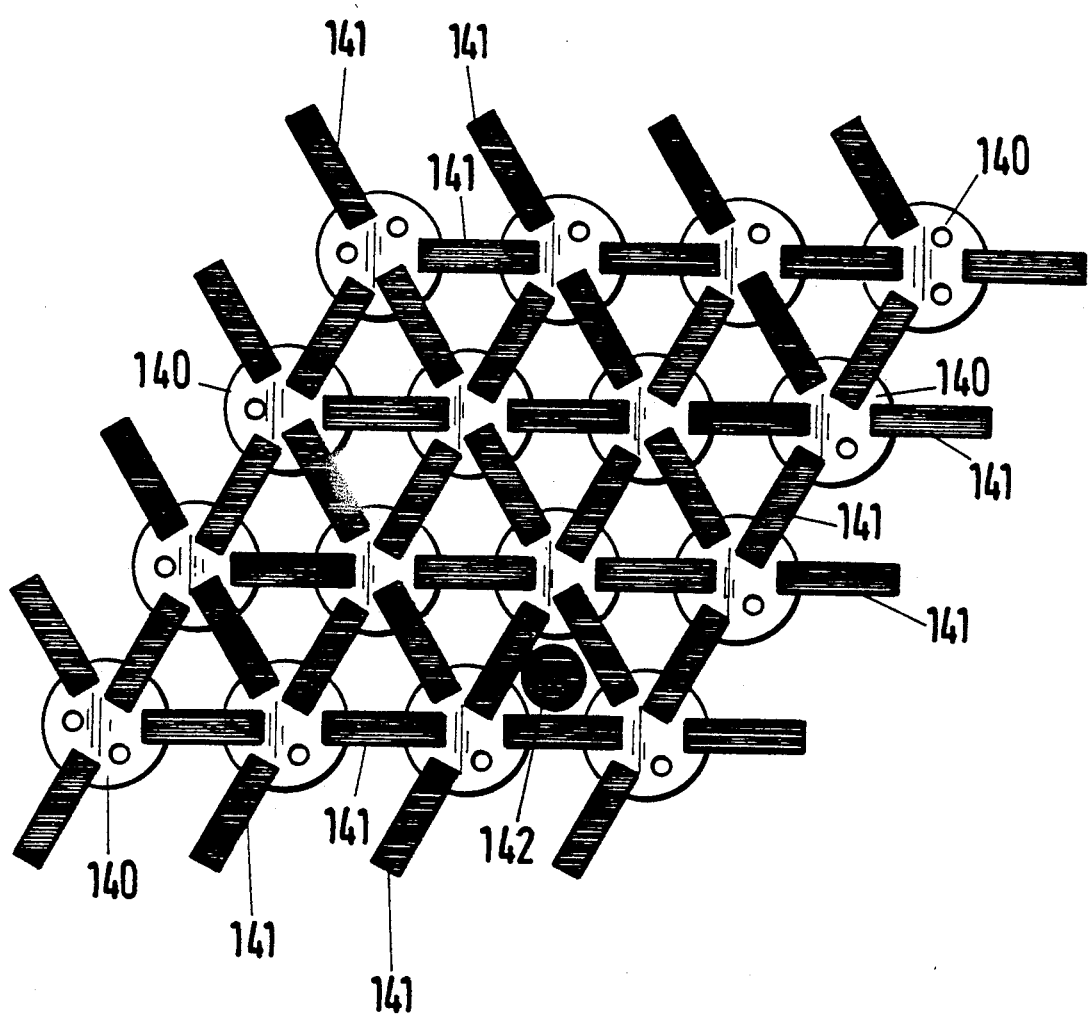
FIG. 14 is a schematic plan view of a limited-compressibility support structure arranged for use as a load restraint.

An embodiment of the invention arranged for use as a load restraint on a truck is shown in FIG. 14. In this case, the support structure is formed by an array of disconnected members 140 similar to the members 40 shown in FIG. 5. As in the embodiment of FIGS. 4 and 5, the members 140 are connected indirectly by an array of elastically deformable elements 141, each consisting of two half-arches. In further conformance to the embodiment of FIGS. 4 and 5, pin connections are provided between the parts 140 and 141.

In this array, interstices are formed between the elastically deformable elements 141. These interstices are engaged by pins, lugs or the like 142 which are affixed to the containers or the like to be transported on the load restraint. This structure provides resilient security against slippage of a load, especially if the members 140 are affixed to the bed of the vehicle.

The invention thus provides a support structure of limited compressibility, assembled in a simple way, having good adaptability to specific uses, and useful for the solution of different problems. If desired, the elastically deformable elements, together with the array of supporting members, may be formed in one piece by injection-molding of an appropriate plastic material.

Although the invention has been described herein with reference to specific embodiments, many modifications and variations therein will readily occur to those skilled in the art. Accordingly, all such variations and modifications are included within the intended scope of the invention.

I claim:

1. An open support structure of limited compressibility comprising support means providing a plurality of spaced support points to support spaced ends of a plurality of support elements and a plurality of elastically deformable support elements spaced from each other in two dimensions extending parallel to the support means, each consisting of at least two half-arches or resilient material joined at a common apex and formed in one piece with the free ends of the half-arches supported at spaced points on the support means and the common apex spaced from the support means.

2. A structure according to claim 1 wherein the support means comprises a plurality of separate members and the plurality of elastically deformable elements have free ends supported by different support members so as to indirectly connect all of the support members in one layer.

3. A structure according to claim 1 wherein the support means comprises a lattice-like support structure.

4. A structure according to claim 1 wherein the free ends of the elastically deformable elements are joined by pin connections to the points of the support means.

5. A structure according to claim 1 wherein the elastically deformable elements and the support means are formed in one piece.

6. A structure according to claim 1 comprising a substantially planar support means and a plurality of elastically deformable members on each side of the support means.

7. A structure according to claim 1 wherein the half-arches of the elastically deformable elements have a shape which is approximately a sine function in the unloaded condition of the structure.

8. A structure according to claim 1 wherein the elastically deformable elements consist of at least three half-arches joined at a common vertex.

9. A structure according to claim 8 wherein the half-arches are disposed at equal angles about their common vertex.

10. A structure according to claim 1, including a plurality of catch pins extending from one side of the support means for engaging a tire tread to provide a snow chain-like structure.

11. A structure according to claim 10, including a plurality of spikes affixed at the vertices of the half-arches.

12. A structure according to claim 1, including a vehicle member having a surface with projecting studs to be received in interstices between the elastically deformable elements to provide a load restraint for the vehicle.

* * * * *